W. H. PAIGE.
Railway Car-Wheels.
No. 141,011. Patented July 22, 1873.
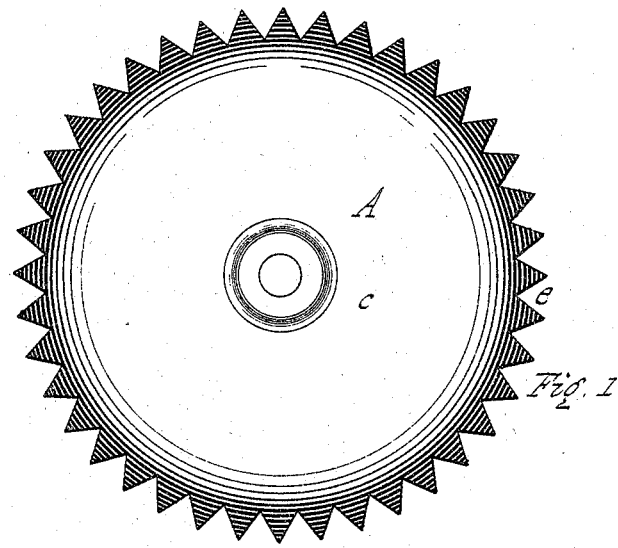
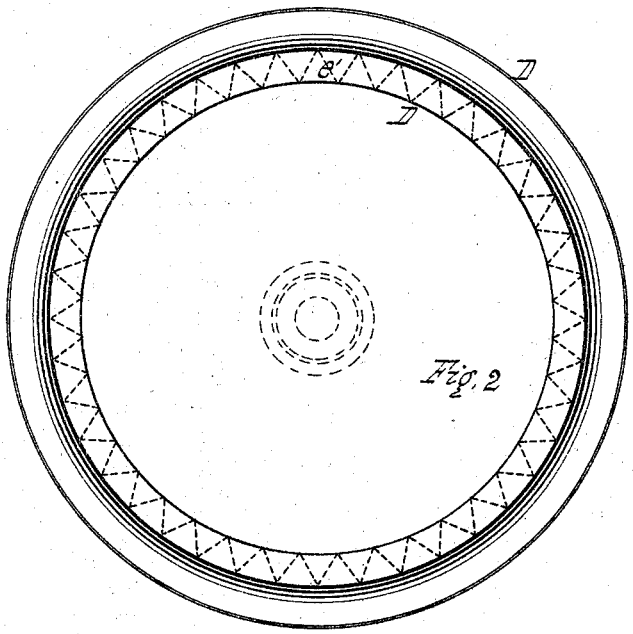
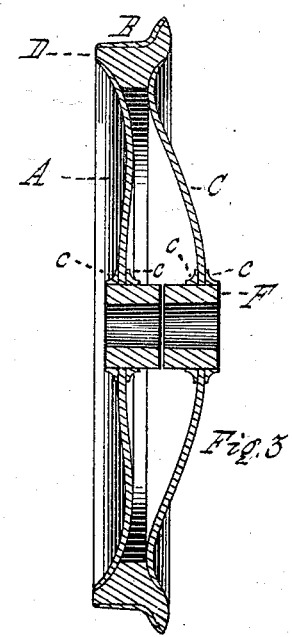
Witnesses,
C. Eugene Buckland.
S. W. Doherty
Inventor,
William H. Paige
By J. H. Curtis
his atty.

UNITED STATES PATENT OFFICE.

WILLIAM H. PAIGE, OF SPRINGFIELD, MASSACHUSETTS, ASSIGNOR OF ONE-HALF HIS RIGHT TO S. T. HAMMOND, OF SAME PLACE.

IMPROVEMENT IN RAILWAY-CAR WHEELS.

Specification forming part of Letters Patent No. 141,011, dated July 22, 1873; application filed March 20, 1873.

*To all whom it may concern:*

Be it known that I, WILLIAM H. PAIGE, of Springfield, in the county of Hampden and State of Massachusetts, have invented a new and useful Improvement in Railway-Car Wheels; and I do hereby declare that the following is a full, clear, and exact description thereof, reference being had to the accompanying drawings making a part of this specification, and to the letters of reference marked thereon, in which—

Figure 1 is a plan or side view of one of the circular disks or plates forming the sides of the wheel, both of which are made of the same form and size. Fig. 2 is a plan or side view of the rim or tire; and Fig. 3 is a transverse section, showing the form of the wheel and the manner in which the several parts are put together.

My invention relates to the manufacture of wrought-iron car-wheels having two side plates, whereby the wheel is made very much stronger and more durable than when made with a single plate; and my invention consists of a car-wheel having the parts forged out in proper form separately, and then welded together so as to form a solid or homogeneous mass, when they are connected together the parts consisting of a hub made in two portions, two disks or side plates, and a tire faced with steel on its tread, if desirable.

That others skilled in the art may be able to make and use my invention, I will proceed to describe the same.

In the drawings, F represents the hub of the wheel, which I make in two parts, as shown in section in Fig. 3, and A represents one of the sides of the wheel, which I forge out of suitable metal, of a circular form, and of proper size, and with its periphery serrated, as shown at *e* in Fig. 1, so that when the disk or plate A is welded to the rim or tire D, the metal at the junction may be as homogeneous as possible, and to increase the welding distance around the periphery of the plate. The other disk or plate C is made of similar form and size, but has a greater degree of convexity given to its outer face, as shown clearly in Fig. 3, and is similarly serrated at its periphery; and these plates or disks have a central hole, into each of which fits one of the hubs F, and a collar, *c*, is placed upon the hub against each side of each plate; and I then heat each hub, with its collars and plate thereon, to a welding heat, and weld each plate and its collars firmly to its hub. The rim D, shown in side view in Fig. 2, and in section in Fig. 3, and the serrated portion of the disks or plates A and C are then heated to a welding heat, and each disk is put in place on the side of the rim, and concentric therewith, as indicated by dotted lines at *e'* in Fig. 2, and the edge of the disks are firmly welded to the rim.

To render the tread of the wheel more durable, and less liable to wear, the rim is heated to a welding heat, and a steel facing or tread is firmly welded to the rim or tire D by any of the well-known processes.

The points of the teeth *e*, or serrated part of the disks or plates, may be rounded, if desirable, giving the appearance of a scalloped edge to the plates; but I prefer to make the teeth pointed, as they operate to make a closer-welded joint; and by making the edge of the plates serrated, or of irregular form, out of a circular line, I increase the welding distance around the edge of the plate, thereby making the joint much stronger, and less liable to become unwelded in using.

I am aware that the hubs of car-wheels have heretofore been made in two parts; but, in casting, it is not possible to make the hubs in two parts without having a space between, and of such a distance that the two parts of the hub cannot be brought together when the wheel is being forced onto the axle; and there is, consequently, great liability of either springing or breaking the inner plate of the wheel, and rendering it weak when brought into use; but, in forging the several parts of the wheel, in which the plates are forged or welded to the rim, I am enabled to bring the two parts of the hub close together, so that in forcing the wheel upon the axle, which is done by heavy pressure, the outer part of the hub is forced against the inner part, and both are forced on together, without the least tendency or liability of springing or breaking either plate.

In the manufacture of this wheel, as above described, the parts are forged up by means of dies made for that purpose, so that the different parts of different wheels are all exactly alike as they come from the dies, and the wheels, when finished, are all of the same size; consequently, there is no necessity of boring out the hub, or of turning off the flange or tread, as is now universally done, to make the wheels all of the same size.

I am aware that railway-car wheels have heretofore been made in which the hub and plates were made of cast-iron, and in two parts, and also having the main body of the wheel cast to a steel tread; but I do not claim a cast-iron wheel, nor any process of manufacture connected with a car-wheel having the hub, plates, and tire made of cast-iron; neither do I claim any process of casting a steel facing or tread to a cast-iron car-wheel.

Having thus described my invention, what I claim as new, and desire to secure by Letters Patent, is—

1. An improved two-plate wrought-iron car-wheel, wherein the hub F, side plates, and rim or tire D are forged separately and welded together, substantially as described.

2. A two-plate wrought-iron car-wheel, having the hub, plates, and tire forged out separately and welded together, the tire D having a steel facing welded thereto, substantially as described.

3. A double-plate wrought-iron car-wheel, having the hub made in two separate parts, welded to the side plates of the wheel, and designed to be secured upon the axle, all substantially as set forth.

Witnesses:     WILLIAM H. PAIGE.
T. A. CURTIS,
C. EUGENE BUCKLAND.